(12) United States Patent
Maeda et al.

(10) Patent No.: US 9,346,097 B2
(45) Date of Patent: May 24, 2016

(54) PROCESS FOR MANUFACTURING ROLLING CONTACT MEMBER, PROCESS FOR MANUFACTURING ROLLING BEARING, RACEWAY MEMBER OF ROLLING BEARING AND ROLLING BEARING

(75) Inventors: Kikuo Maeda, Kuwana (JP); Yuji Okamoto, Iwata (JP)

(73) Assignee: NTN Corporation, Osaka (JP)

( * ) Notice: Subject to any disclaimer, the term of this patent is extended or adjusted under 35 U.S.C. 154(b) by 670 days.

(21) Appl. No.: 13/310,423

(22) Filed: Dec. 2, 2011

(65) Prior Publication Data
US 2012/0137523 A1    Jun. 7, 2012

Related U.S. Application Data

(62) Division of application No. 12/302,988, filed as application No. PCT/JP2007/060333 on May 21, 2007, now abandoned.

(30) Foreign Application Priority Data

Jun. 1, 2006    (JP) .................................. 2006-153734

(51) Int. Cl.
*B21K 1/04*    (2006.01)
*B23P 15/00*    (2006.01)
(Continued)

(52) U.S. Cl.
CPC .................. *B21K 1/04* (2013.01); *B23P 15/003* (2013.01); *F16C 19/364* (2013.01); *F16C 33/32* (2013.01);
(Continued)

(58) Field of Classification Search
CPC ......... B21K 1/04; F16C 19/364; F16C 19/06; F16C 33/366; F16C 33/32; F16C 33/64; B23P 15/003; Y10T 29/49709; Y10T 29/49679; Y10T 29/49643; Y10T 29/49684
USPC ....................................... 29/898.06
See application file for complete search history.

(56) References Cited

U.S. PATENT DOCUMENTS 6,620,262 B1    9/2003    Okita et al.
2003/0154601 A1    8/2003    Obara

FOREIGN PATENT DOCUMENTS

CN    1447036 A    10/2003
CN    2735068 Y    10/2005
(Continued)

OTHER PUBLICATIONS

Japanese Office Action, with English translation, issued in Japanese Patent Application No. 2006-153734, dated Dec. 20, 2011.
(Continued)

*Primary Examiner* — Moshe Wilensky
(74) *Attorney, Agent, or Firm* — McDermott Will & Emery LLP

(57) ABSTRACT

A process for manufacturing a rolling contact member comprises preparing a steel member consisting of a steel containing 0.7 mass % or more of carbon; performing hot forging of the steel member prepared in the steel member preparation step to thereby obtain a blank ring as the first forged member; performing turning of the blank ring obtained in the hot forging step to thereby remove part of the blank ring; and performing cold forging of the blank ring wrought in the first turning step to thereby obtain a stepped ring. In the steps subsequent to the cold forging step, on the stepped ring, the area wrought in the first turning step is not subjected to cutting.

7 Claims, 6 Drawing Sheets

(51) Int. Cl.
*F16C 33/32* (2006.01)
*F16C 33/64* (2006.01)
*F16C 19/36* (2006.01)
*F16C 33/36* (2006.01)
*F16C 19/06* (2006.01)

(52) U.S. Cl.
CPC ............... *F16C 33/366* (2013.01); *F16C 33/64* (2013.01); *F16C 19/06* (2013.01); *Y10T 29/49643* (2015.01); *Y10T 29/49679* (2015.01); *Y10T 29/49684* (2015.01); *Y10T 29/49709* (2015.01)

(56) References Cited

FOREIGN PATENT DOCUMENTS

| | | |
|---|---|---|
| JP | 09-176740 | 7/1997 |
| JP | 11-207531 | 8/1999 |
| JP | 11-347673 | 12/1999 |
| JP | 2002-282993 | 10/2002 |
| JP | 2002-285233 | 10/2002 |
| JP | 2003-194072 | 7/2003 |
| JP | 2004-261895 | 9/2004 |
| JP | 2005163060 A * | 6/2005 |
| WO | WO 99/34023 A1 | 7/1999 |

OTHER PUBLICATIONS

Chinese Office Action, with English Translation, issued in Japanese Patent Application No. 20780020113.6, mailed Apr. 13, 2010.

* cited by examiner

PROCESS FOR MANUFACTURING ROLLING CONTACT MEMBER, PROCESS FOR MANUFACTURING ROLLING BEARING, RACEWAY MEMBER OF ROLLING BEARING AND ROLLING BEARING

RELATED APPLICATIONS

This application is a Divisional of U.S. application Ser. No. 12/302,988, filed on Dec. 1, 2008 now abandoned, which is the U.S. National Phase under 35 U.S.C. §371 of International Application No. PCT/JP2007/060333, filed on May 21, 2007, which in turn claims the benefit of Japanese Application No. 2006-153734, filed on Jun. 1, 2006, the disclosures of which Applications are incorporated by reference herein.

TECHNICAL FIELD

The present invention relates to a process for manufacturing a rolling contact member, a process for manufacturing a rolling bearing, a raceway member of a rolling bearing and a rolling bearing, and more specifically, it relates to a process for manufacturing a rolling contact member made of steel containing at least 0.7 mass % of carbon, a process for manufacturing a rolling bearing, a raceway member of a rolling bearing and a rolling bearing.

BACKGROUND ART

In general, SUJ2 (JIS G4805) which is high-carbon chromium bearing steel or the like is widely employed as the material for a rolling contact member constituting a rolling bearing. In a case of manufacturing a rolling contact member with a material such as a steel bar made of high-carbon steel such as SUJ2, this material is hot-worked, thereafter subjected to spheroidizing annealing, further cold-worked, and subjected to quench hardening in general.

An example of a conventional process for manufacturing a rolling contact member and a rolling bearing is now described. Referring to FIG. 11, a material such as a steel bar made of high-carbon steel such as SUJ2 is prepared in a step (S111). Then, the material is cut in a step (S112), and the cut material is hot-forged in air in a step (S113) so that a blank ring is prepared. Thereafter the blank ring is heated in air to a prescribed temperature in a step (S114A), to be subjected to spheroidizing annealing. Thus, the blank ring is softened while the state of the microstructure of the steel constituting the blank ring is improved, and workability (easiness of working) is improved. This blank ring is cold-forged in a step (S116), and a stepped ring for collecting an inner ring and an outer ring of the rolling bearing is prepared. Then, this stepped ring is separated into an inner ring portion and an outer ring portion in a step (S117), and the overall surfaces of the inner ring portion and the outer ring portion are turned in a step (S118A). Thus, formed rings having schematic shapes of the inner ring and the outer ring of the rolling bearing are prepared.

Further, the formed rings are quench-hardened in a step (S119), thereafter subjected to tempering in a step (S120), and subjected to finishing such as grinding in a step (S121). Thus, the inner ring and the outer ring of the rolling bearing as rolling contact members are completed. In a step (S122), the inner ring and the outer ring and separately prepared rolling elements etc. are combined with each other, to complete the rolling bearing.

The hot forging in the step (S113) and the annealing in the step (S114A) are executed by heating the blank ring in air. Therefore, a layer of iron oxide (scale) is formed on the surface layer portion of the blank ring, while a decarburized layer reduced in carbon content as compared with the interior is formed immediately under the scale. At this time, the surface of the blank ring is remarkably irregularized due to the formation of the scale. In the cold forging in the step (S116), therefore, such a phenomenon (burring) may take place that the surface of the blank ring is internally rolled. If the burring takes place, this portion results in defects of the completed rolling contact members, and exerts bad influence on durability. If the carbon content in the surface layer portion is reduced due to the formation of the decarburized layer, not only sufficient hardness cannot be ensured by the quench hardening in the step (S119), but also tensile stress may remain in the surface layer portion, to exert bad influence on the durability.

In the step (S118A), therefore, the overall surfaces of the separated portions of the stepped ring are so turned that the scale, and the burr and the decarburized layer attributed to the scale are removed, and the bad influence on the durability of the rolling contact member attributed to the aforementioned scale and the formation of the decarburized layer is avoided. In the aforementioned manufacturing step, however, the overall surfaces of the separated portions of the stepped ring are so turned that not only the number of steps of working is increased but also the yield of the material is reduced, and the manufacturing cost for the rolling contact members and the rolling bearing is increased.

Another example of a conventional process for manufacturing a rolling contact member and a rolling bearing is now described. Referring to FIG. 12, this example of the conventional process for manufacturing a rolling contact member and a rolling bearing is basically similar to the conventional process for manufacturing a rolling contact member and a rolling bearing described with reference to FIG. 11. In the manufacturing process of FIG. 12, however, recarburization annealing of performing annealing while recarburizing the decarburized layer formed in the step (S113) is executed as a step (S114B) by controlling a carbon potential ($C_p$) value in the annealing atmosphere, in place of the annealing in air in the step (S114A) of the manufacturing process shown in FIG. 11. Thus, the decarburized layer disappears in the step (S114B), whereby the aforementioned full turning for the purpose of removing the decarburized layer is unnecessary. A step (S118B) of turning only an area hard to form by cold forging for such a reason that the shape thereof is complicated is executed in place of the step (S118A) of FIG. 11. Consequently, regions subjected to the turning can be reduced in the separated portions of the stepped ring, and the manufacturing cost can be reduced. In addition, various measures for suppressing formation of the decarburized layer or eliminating the formed decarburized layer are proposed (Japanese Patent Laying-Open No. 2002-285233 (Patent Document 1), Japanese Patent Laying-Open No. 2003-194072 (Patent Document 2), Japanese Patent Laying-Open No. 9-176740 (Patent Document 3) and Japanese Patent Laying-Open No. 11-347673 (Patent Document 4)).

Patent Document 1: Japanese Patent Laying-Open No. 2002-285233
Patent Document 2: Japanese Patent Laying-Open No. 2003-194072
Patent Document 3: Japanese Patent Laying-Open No. 9-176740
Patent Document 4: Japanese Patent Laying-Open No. 11-347673

DISCLOSURE OF THE INVENTION

Problems to be Solved by the Invention

In each of the aforementioned process for manufacturing a rolling contact member described with reference to FIG. 12 and manufacturing processes disclosed in Patent Documents 1 to 4, however, the manufacturing cost cannot be reduced while sufficiently solving the problems attributed to formation of the scale, although the problems attributed to the decarburized layer are solvable.

Accordingly, an object of the present invention is to provide processes for manufacturing a rolling contact member and a rolling bearing each capable of reducing the manufacturing cost by reducing area subjected to cutting such as turning executed after hot forging and annealing in the rolling contact member while simultaneously avoiding problems attributed to formation of a decarburized layer and problems attributed to formation of a scale. Another object of the present invention is to provide a raceway member of a rolling bearing and a rolling bearing each reduced in manufacturing cost while simultaneously avoiding problems attributed to formation of a decarburized layer and problems attributed to formation of a scale.

Means for Solving the Problems

A process for manufacturing a rolling contact member according to the present invention comprises a steel member preparation step, a hot forging step, a cutting step and a cold forging step. In the steel member preparation step, a steel member made of steel containing at least 0.7 mass % of carbon is prepared. In the hot forging step, the steel member prepared in the steel member preparation step is so hot-forged that a first forged member is prepared. In the cutting step, the first forged member prepared in the hot forging step is so cut that a part of the first forged member is removed. The part of this first forged member is a region (region having a depth of about 0.2 mm from the surface) sufficient for removing a scale and a decarburized layer from a surface requiring no formation of irregularity in a product state, for example. In the cold forging step, the first forged member cut in the cutting step is so cold-forged that a second forged member is prepared. In a step subsequent to the cold forging step, the area of the second forged member cut in the cutting step is not cut.

According to the inventive process for manufacturing a rolling contact member, a part of the first forged member is so cut in the cutting step that the scale and the decarburized layer of this part are removed. In the cold forging step, the part of the first forged member from which the scale and the decarburized layer have been removed in the cutting step is formed into the shape of a product to become the second forged member, and this part is thereafter not cut in the steps up to completion of the rolling contact member.

In other words, in the inventive process for manufacturing a rolling contact member, as to a part corresponding to the part less irregularized in shape of the rolling contact member to be manufactured and workable into the shape by cold forging, this part is so cut that the decarburized layer and the scale are removed in the stage of the first forged member having a relatively simple shape before the execution of the cold forging. Then, the cold forging is so executed in the cold forging step that this part is formed into the shape of the rolling contact member while problems such as insufficient quench hardening and residual of tensile stress attributed to the decarburized layer and occurrence of a burring attributed to the scale are solved. Therefore, this part can be completed by performing finishing such as grinding and super finishing, whereby no cutting may be executed after the cold forging step (near net shape).

As to a part of the rolling contact member hard to work into the shape by the cold forging for such a reason that the same is remarkably irregularized, on the other hand, cutting such as turning is required after the cold forging step. Even if a burr and a decarburized layer remain after the cold forging as to such a part, these are removed by the cutting executed after the cold forging step. Therefore, neither problems attributed to formation of the decarburized layer nor problems attributed to formation of the scale arise, even if such a part is not cut in the cutting step.

According to the inventive process for manufacturing a rolling contact member, as hereinabove described, the manufacturing cost can be reduced by reducing regions subjected to cutting such as turning executed after the cold forging in the rolling contact member while simultaneously avoiding the problems attributed to formation of the decarburized layer and the problems attributed to formation of the scale.

The cutting denotes working such as turning for cutting a workpiece with a cutter (cutting tool), and includes no working such as grinding, polishing or super finishing.

A process for manufacturing a rolling bearing according to the present invention comprises a raceway member manufacturing step of manufacturing a raceway member, a rolling element manufacturing step of manufacturing a rolling element and an assembling step of assembling a rolling bearing by combining the raceway member manufactured in the raceway member manufacturing step and the rolling element manufactured in the rolling element manufacturing step with each other. The raceway member manufacturing step is executed by the aforementioned process for manufacturing a rolling contact member.

According to the inventive process for manufacturing a rolling bearing, the raceway member manufacturing step is executed by the aforementioned process for manufacturing a rolling contact member capable of reducing the manufacturing cost while simultaneously avoiding the problems attributed to formation of the decarburized layer and the problems attributed to formation of the scale. Therefore, a rolling bearing reduced in manufacturing cost can be manufactured while the problems attributed to formation of the decarburized layer and the scale are simultaneously avoided.

A raceway member of a rolling bearing according to the present invention is manufactured by the aforementioned process for manufacturing a rolling contact member. According to the inventive raceway member of a rolling bearing, a raceway member of a rolling bearing reduced in manufacturing cost can be provided while the problems attributed to formation of the decarburized layer and the scale are avoided.

A bearing ring of a tapered roller bearing according to the present invention is manufactured by the aforementioned process for manufacturing a rolling contact member. The bearing ring of a tapered roller bearing having a relatively simple structure has a large region requiring no cutting after the cold forging, and is so manufactured by the aforementioned process for manufacturing a rolling contact member that an effect of reducing the manufacturing cost is remarkable.

A rolling bearing according to the present invention comprises a raceway member and a plurality of rolling elements arranged on an annular raceway in contact with the raceway member. The raceway member is the aforementioned raceway member of a rolling bearing according to the present invention. According to the inventive rolling bearing, a rolling bearing reduced in manufacturing cost can be provided while the problems attributed to formation of the decarburized layer and the scale are simultaneously avoided.

Effects of the Invention

As obvious from the above description, the manufacturing cost can be reduced by reducing regions subjected to the cutting such as turning executed after the hot forging and the annealing in the rolling contact member while simultaneously avoiding the problems attributed to formation of the decarburized layer and the problems attributed to formation of the scale according to each of the inventive processes for manufacturing a rolling contact member and a rolling bearing. According to the inventive raceway member of a bearing and the inventive rolling bearing, a raceway member of a bearing and a rolling bearing reduced in manufacturing cost can be provided while simultaneously avoiding the problems attributed to formation of the decarburized layer and the problems attributed to formation of the scale.

Figure 1:
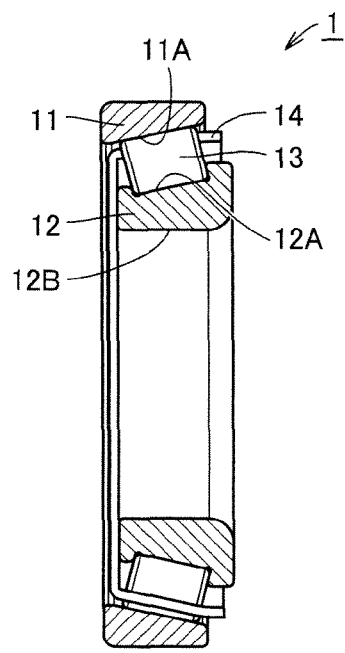
FIG. 1 is a schematic sectional view showing the structure of a tapered rolling bearing as a rolling bearing comprising a raceway member of a rolling bearing according to one embodiment of the present invention.

DESCRIPTION OF THE REFERENCE SIGNS 1 tapered roller bearing, 2 deep groove ball bearing, 5 steel member, 6 blank ring, 6A end face, 6B inner peripheral surface, 6 end face surface layer portion, 6D inner peripheral surface layer portion, 7 stepped ring, 7A large annular portion, 7B small annular portion, 11, 21 outer ring, 11A, 21A outer ring rolling surface, 12, 22 inner ring, 12A, 22A inner ring rolling surface, 12B inner ring inner peripheral surface, 13 roller, 14, 24 cage, 23 ball, 90 test surface, 91 burr.

BEST MODES FOR CARRYING OUT THE INVENTION

Embodiments of the present invention are now described with reference to the drawings. In the following drawings, identical or corresponding portions are denoted by the same reference numerals and redundant description thereof is not repeated.

First, a tapered roller bearing as a roller bearing according to one embodiment of the present invention is described.

Referring to FIG. 1, a tapered roller bearing 1 comprises an annular outer ring 11 as a raceway member, an annular inner ring 12 as a raceway member arranged inside outer ring 11 and a plurality of rollers 13 as rolling elements arranged between outer ring 11 and inner ring 12 and held by an annular cage 14. An outer ring rolling surface 11A is formed on the inner peripheral surface of outer ring 11, and an inner ring rolling surface 12A is formed on the outer peripheral surface of inner ring 12. Outer ring 11 and inner ring 12 are so arranged that inner ring rolling surface 12A and outer ring rolling surface 11A are opposed to each other. Plurality of roller 13 are in contact with inner ring rolling surface 12A and outer ring rolling surface 11A, and arranged in the peripheral direction at a prescribed pitch to be rollably held on an annular raceway by cage 14. Tapered roller bearing 1 is so constituted that the apices of a cone including outer ring rolling surface 11A, a cone including inner ring rolling surface 12A and a cone including the locus of a rotating axis in a case where rollers 13 roll intersect with each other on one point on the centerline of the bearing. According to this structure, outer ring 11 and inner ring 12 of tapered roller bearing 1 are mutually relatively rotatable.

Outer ring 11 and inner ring 12 as the raceway members of the rolling bearing according to this embodiment are manufactured by a process for manufacturing a rolling contact member according to one embodiment of the present invention described later. Consequently, the manufacturing cost is reduced while simultaneously avoiding problems attributed to formation of a decarburized layer and problems attributed to formation of a scale.

A deep groove ball bearing as a rolling bearing according to another embodiment of the present invention is now described.

Figure 2:
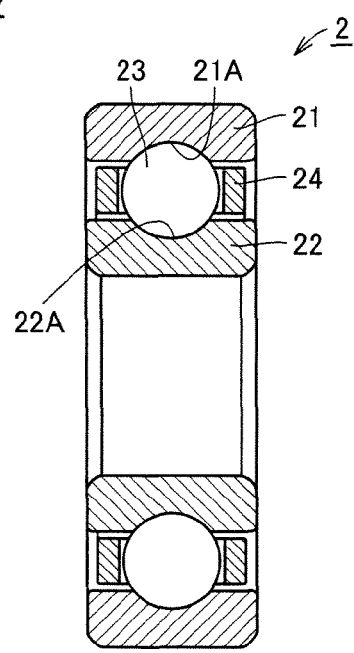
FIG. 2 is a schematic sectional view showing the structure of a deep groove ball bearing as a rolling bearing comprising a raceway member of a rolling bearing according to another embodiment of the present invention.

Referring to FIG. 2, a deep groove ball bearing 2 basically has a structure similar to that of tapered roller bearing 1 described with reference to FIG. 1. However, deep groove ball bearing 2 is different from tapered roller bearing 1 in the structures of raceway members and rolling elements. In other words, deep groove ball bearing 2 comprises an annular outer ring 21 as a raceway member, an annular inner ring 22 as a raceway member arranged inside outer ring 21 and a plurality of balls 23 as rolling elements arranged between outer ring 21 and inner ring 22 and held by an annular cage 24. An outer ring rolling surface 21A is formed on the inner peripheral surface of outer ring 21, and an inner ring rolling surface 22A is formed on the outer peripheral surface of inner ring 22. Outer ring 21 and inner ring 22 are so arranged that inner ring rolling surface 22A and outer ring rolling surface 21A are opposed to each other. Further, plurality of balls 23 are in contact with inner ring rolling surface 22A and outer ring rolling surface 21A, and arranged in the peripheral direction at a prescribed pitch to be rollably held on an annular raceway by cage 24. According to this structure, outer ring 21 and inner ring 22 of deep groove ball bearing 2 are mutually relatively rotatable.

Outer ring 21 and inner ring 22 as the raceway members of the rolling bearing according to this embodiment are manufactured by the process for manufacturing a rolling contact member according to one embodiment of the present invention described later. Consequently, the manufacturing cost is reduced while simultaneously avoiding problems attributed to formation of a decarburized layer and problems attributed to formation of a scale.

The processes for manufacturing a rolling contact member and a rolling bearing according to one embodiment of the present invention are now described. While the manufacturing processes are described with reference to tapered roller bearing 1 according to the aforementioned embodiment of the inventive rolling bearing, a rolling contact member and a rolling bearing having other shapes, inclusive of the aforementioned deep groove ball bearing 2, can also be similarly manufactured.

Figure 3:
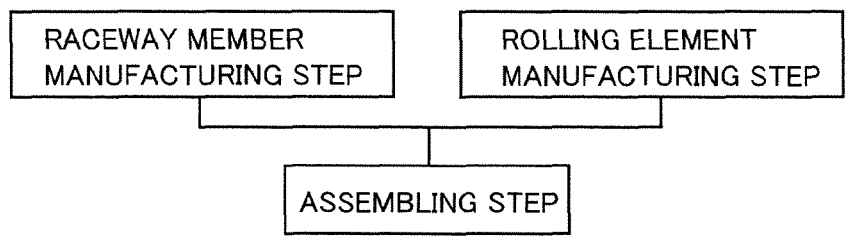
FIG. 3 is a diagram showing an outline of a process for manufacturing a rolling bearing according to one embodiment of the present invention.

Referring to FIG. 3, a raceway member manufacturing step of manufacturing a raceway member and a rolling element manufacturing step of manufacturing rolling elements are first executed in the process for manufacturing tapered roller bearing 1 as the rolling bearing in one embodiment of the present invention. More specifically, outer ring 11, inner ring 12 etc. as rolling contact members are manufactured in the raceway member manufacturing step. In the rolling element manufacturing step, on the other hand, rollers 13 etc. are manufactured.

Then, an assembling step of assembling tapered roller bearing 1 is executed by combining the raceway members manufactured in the raceway member manufacturing step and the rolling elements manufactured in the rolling element manufacturing step with each other. More specifically, tapered roller bearing 1 is assembled by combining outer ring 11, inner ring 12 and rollers 13 and separately prepared cage 14 with each other, for example. The aforementioned raceway member manufacturing step is executed by the following process for manufacturing a rolling contact member, for example.

Figure 4:
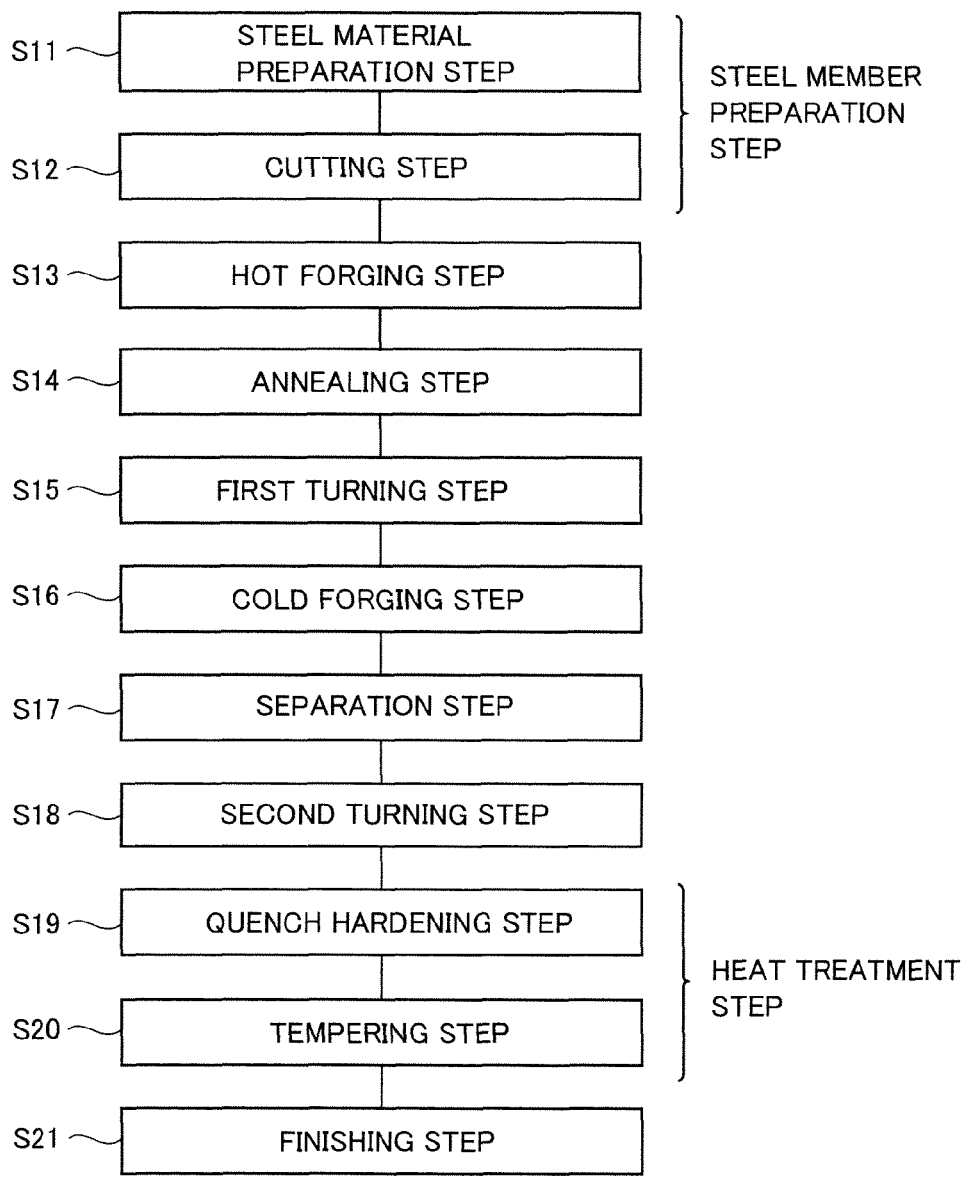
FIG. 4 is a diagram showing an outline of a process for manufacturing a rolling contact member included in the process for manufacturing a rolling bearing according to one embodiment of the present invention.
Figure 5:
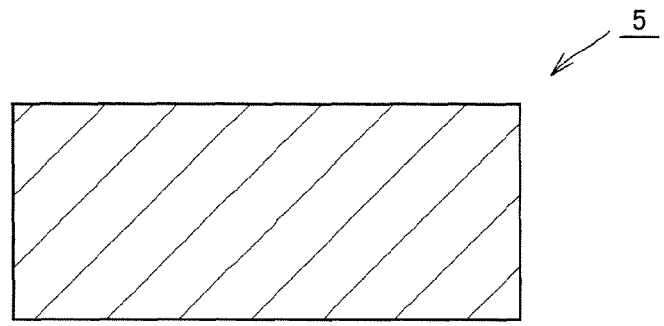
FIG. 5 is a schematic sectional view showing a steel member serving as the material for the rolling contact member and the rolling bearing.

Referring to FIG. 4, a steel member preparation step of preparing a steel member consisting of steel containing at least 0.7 mass % of carbon is executed in the process for manufacturing a rolling contact member in this embodiment. The steel member preparation step includes a steel material preparation step (S11) of preparing a steel material such as a steel bar containing at least 0.7 mass % of carbon and a cutting step of preparing the steel member by cutting the steel material prepared in the step (S11). More specifically, a steel bar having a circular section perpendicular to the longitudinal direction is cut along a surface perpendicular to the longitudinal direction, whereby a steel member 5 having a discoidal shape shown in FIG. 5 is prepared.

As the steel containing at least 0.7 mass % of carbon, bearing steel such as SUJ2 or SUJ3 according to JIS, spring steel such as SUP3, carbon tool steel such as SK3 or SK4 or the like can be listed, for example, and the bearing steel suitable as the material for rolling contact members is preferably employed in particular.

Figure 6:
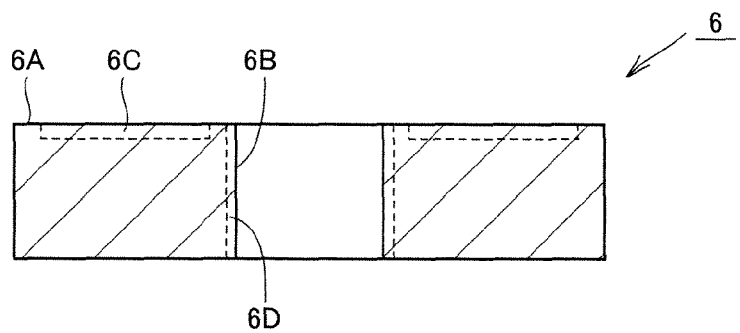
FIG. 6 is a schematic sectional view showing a blank ring as a first forged member prepared in each of the processes of manufacturing a rolling contact member and a rolling bearing.

Referring to FIG. 4, a hot forging step (S13) of preparing a first forged member by hot-forging steel member 5 in air prepared in the step (S11) and the step (S12) is executed. More specifically, steel member 5 is heated to a temperature of at least 950° C. and not more than 1150° C., e.g. 1050° C., which is a temperature of at least the recrystallization temperature of the steel constituting steel member 5, and working such as upsetting or punching is executed, referring to FIGS. 5 and 6. Thus, a through-hole passing through major surfaces on both sides is formed, and a blank ring 6 as a first forged member having an annular shape is prepared, as shown in FIG. 6.

Referring to FIG. 4, further, an annealing step (S14) of performing annealing (anneal) for improving the workability of blank ring 6 prepared in the step (S13) is executed in air. More specifically, when the steel material prepared in the step (S11) is bearing steel (JIS system), for example, spheroidizing annealing is executed by heating the steel material to a temperature of at least 740° C. and not more than 820° C., e.g. 780° C., in the temperature range immediately above a $A_1$ point, holding the same for a time of at least 30 minutes and not more than 180 minutes, e.g. 60 minutes, and thereafter slowly cooling the same to a temperature range of not more than the $A_1$ point. Thus, the hardness of blank ring 6 is reduced to not more than 90 HRB, while the state of the microstructure of the steel constituting blank ring 6 is improved and the workability is improved. The step (S13) and the step (S14) are executed by heating steel member 5 or blank ring 6 in air as described above, whereby a scale is formed on the surface of blank ring 6, and a decarburized layer is formed immediately under the scale.

Referring to FIG. 4, a first turning step (S15) as a cutting step of removing parts of blank ring 6 by cutting blank ring 6 prepared in the step (S13) and subjected to the annealing in the step (S14) is executed. More specifically, a first end face 6A of blank ring 6 which is a part for forming outer rolling surface 11A of tapered roller bearing 1 and an inner peripheral surface 6B of blank ring 6 which is a part for forming an inner ring inner peripheral surface 12B of tapered roller bearing 1 are turned. Thus, an end face surface layer portion 6C and an inner peripheral surface layer portion 6D which are parts of blank ring 6 are removed, and the scale and the decarburized layer having been formed on these areas are removed.

The thickness of the surface layer portion of blank ring 6 removed in the step (S15) can be properly decided in response to the thickness of the decarburized layer decided by the type of the steel constituting the blank ring and the conditions of the hot working and the annealing. More specifically, the thickness of the decarburized layer is about 0.1 to 0.2 mm in general, and the thickness of the removed surface layer portion of blank ring 6 must be at least 0.2 mm, and is preferably set to at least 0.3 mm, in consideration of the accuracy of the blank ring. Further, the removed thickness of blank ring 6 is preferably set to not more than 1.5 mm, in consideration of improvement in the yield of the material. In the step (S15), first end face 6A of blank ring 6 may be partially turned, or may be entirely turned. Similarly, inner peripheral surface 6B of blank ring 6 may be partially turned, or may be entirely turned in the step (S15).

Figure 7:
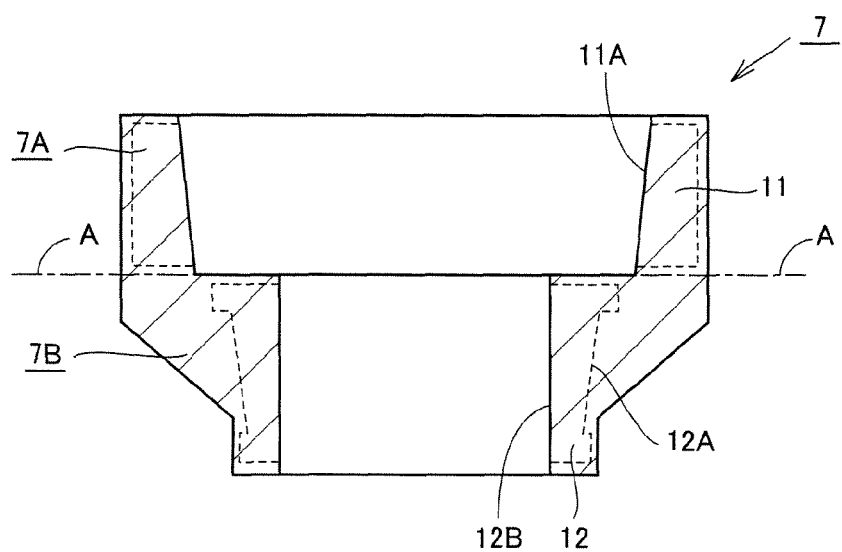
FIG. 7 is a schematic sectional view showing a stepped ring as a second forged member prepared in each of the processes of manufacturing a rolling contact member and a rolling bearing.

Referring to FIG. 4, further, a cold forging step (S16) of preparing a stepped ring as a second forged member by cold-forging blank ring 6 cut in the step (S15) is executed. More specifically, blank ring 6 is so cold-forged that a stepped ring 7 from which one outer ring 11 and one inner ring 12 of tapered roller bearing 1 can be collected is prepared, referring to FIGS. 1 and 7.

Stepped ring 7 has an annular shape, and includes a large annular portion 7A having a large inner diameter for collecting outer ring 11 and a small annular portion 7B for collecting inner ring 12 having a smaller inner diameter than the large annular portion. The inner peripheral surface of large annular portion 7A, corresponding to aforementioned first end face 6A of blank ring 6, is a portion for forming outer ring rolling surface 11A. The inner peripheral surface of small annular portion 7B, corresponding to inner peripheral surface 6B of blank ring 6, is a portion for forming inner ring inner peripheral surface 12B.

In outer ring 11 and inner ring 12, the portions for forming outer ring rolling surface 11A and inner ring inner peripheral surface 12B that need not be irregularized, and having relatively simple shapes are formed without leaving allowances for the turning. As described above, the scale and the decarburized layer have already been removed by the turning, and these portions are in excellent surface states from which the decarburized layer has been removed and in which occurrence of a burr is suppressed. In a step subsequent to the step (S16), therefore, the portions of stepped ring 7 for forming outer ring rolling surface 11A and inner ring inner peripheral surface 12B which are the areas having been turned in the step (S15) are not cut.

Referring to FIG. 4, a separation step (S17) of separating stepped ring 7 into a portion for forming outer ring 11 and a portion for forming inner ring 12 is executed. More specifically, stepped ring 7 prepared in the step (S16) is cut (annularly cut) on a surface along a line segment A and separated, referring to FIG. 7. Further, a second turning step (S18) as a second cutting step of removing a part of stepped ring 7 prepared in the step (S16) and separated in the step (S17) by cutting is executed. More specifically, formed rings having shapes similar to those of outer ring 11 and inner ring 12 are prepared by turning only areas of separated stepped ring 7 other than the areas turned (cut) in the first turning step, referring to FIG. 7.

Referring to FIG. 4, a heat treatment step of heat-treating the formed rings prepared in the step (S18) is executed. The heat treatment step includes a quench hardening step (S19) and a tempering step (S20). In the step (S19), the formed rings are heated, and cooled from a temperature of at least the $A_1$ point of the steel (SUJ2, for example) constituting the formed rings to a temperature of not more than a $M_s$ point, so that the formed rings are quench-hardened. More specifically, the formed rings are quench-hardened by being heated to a temperature of at least 800° C. and not more than 1000° C., e.g. 850° C., which is a temperature of at least the $A_1$ point, held for a time of at least 30 minutes and not more than 150 minutes, e.g. 60 minutes, thereafter being dipped in oil (oil cooling) to be cooled to a temperature of not more than the $M_s$ point.

The $A_1$ point denotes a point corresponding to a temperature at which the structure of the steel starts transformation from ferrite into austenite when the steel is heated. The $M_s$ point denotes a point corresponding to a temperature at which the steel starts transformation from austenite into martensite when the same is cooled.

In the step (S20), further, the quench-hardened formed rings are heated to a temperature of lower than the $A_1$ point to be tempered. More specifically, the quench-hardened formed rings are heated to a temperature of at least 150° C. and not more than 350° C., e.g. 180° C., which is a temperature of lower than the $A_1$ point, held for a time of at least 30 minutes and not more than 240 minutes, e.g. 120 minutes, and thereafter cooled in air of the room temperature (air cooling).

Referring to FIG. 4, a finishing step (S21) is executed. More specifically, finishing such as grinding and super finishing is executed on the formed rings subjected to the heat treatment step. Even if a burr has taken place in the step (S16), the quantity thereof is small and hence the burr is sufficiently removed by this finishing. Thus, outer ring 11 and inner ring 12 as the bearing rings (rolling contact members) of the rolling bearing are completed.

According to the process for manufacturing bearing rings (rolling contact elements) of a rolling bearing and a rolling bearing in this embodiment, as hereinabove described, first end face 6A and inner peripheral surface 6B of blank ring 6 are so turned in the step (S15) that the scale and the decarburized layer are removed from these portions. At this time, blank ring 6 has a relatively simple shape, and the room for selection of the area for holding blank ring 6 in the turning is large. Therefore, the aforementioned turning can be relatively easily executed at a low cost.

In the step (S16), the parts of blank ring 6 from which the scale and the decarburized layer have been removed in the step (S15) are formed into the shapes of outer ring 11 and inner ring 12 to become stepped ring 7, and these parts are thereafter not cut in the steps up to completion of outer ring 11 and inner ring 12.

In other words, in the processes for manufacturing a rolling contact member and a rolling bearing according to this embodiment, as to first end face 6A and inner peripheral surface 6B corresponding to outer ring rolling surface 11A and inner ring inner peripheral surface 12B whose shapes are not irregularized, and workable into these shapes by the cold forging, the decarburized layer and the scale are removed by turning these parts in the stage of blank ring 6 having the relatively simple shape before the execution of the cold forging. Then, the cold forging is executed in the step (S16), whereby these parts are formed into the shapes of outer ring 11 and inner ring 12 in the state where the problems such as insufficient quench hardening and residual of tensile stress attributed to the decarburized layer and occurrence of a burr attributed to the scale are solved in these parts. Therefore, these parts can be completed by simply performing the finishing such as grinding and super finishing after the heat treatment, whereby no cutting may be executed after the step (S16). Finished surface accuracy and surface roughness in the cold forging are decided by die accuracy and accuracy of at least present turning accuracy can be maintained, whereby no problem on an accuracy in cold forging finishing arises.

As to parts hard to work into the shapes by the cold forging for such a reason that flanges or the like must be formed in outer ring 11 and inner ring 12, on the other hand, cutting such as turning is required after the step (S16). Even if a burr and a decarburized layer remain after the cold forging as to such parts, these are removed in the step (S18). Therefore, neither problems attributed to formation of the decarburized layer nor problems attributed to formation of the scale arise even if such parts are not turned in the step (S15).

In other words, according to the processes for manufacturing a rolling contact member and a rolling bearing of this embodiment, areas subjected to the turning in the step (S18) executed after the cold forging can be reduced in outer ring 11 and inner ring 12, while simultaneously avoiding the problems attributed to formation of the decarburized layer and the problems attributed to formation of the scale. The shapes of the formed rings turned in the step (S18) are more complicated as compared with blank ring 6 and so close to the shape of the product that the room for selection of the area held in the turning is small, and hence the cost for the turning in the step (S18) tends to increase. Therefore, the manufacturing cost for the rolling contact member and the rolling bearing can be suppressed while improving the yield of the material by reducing areas subjected to the turning in the step (S18), as hereinabove described.

Example 1

Figure 11:
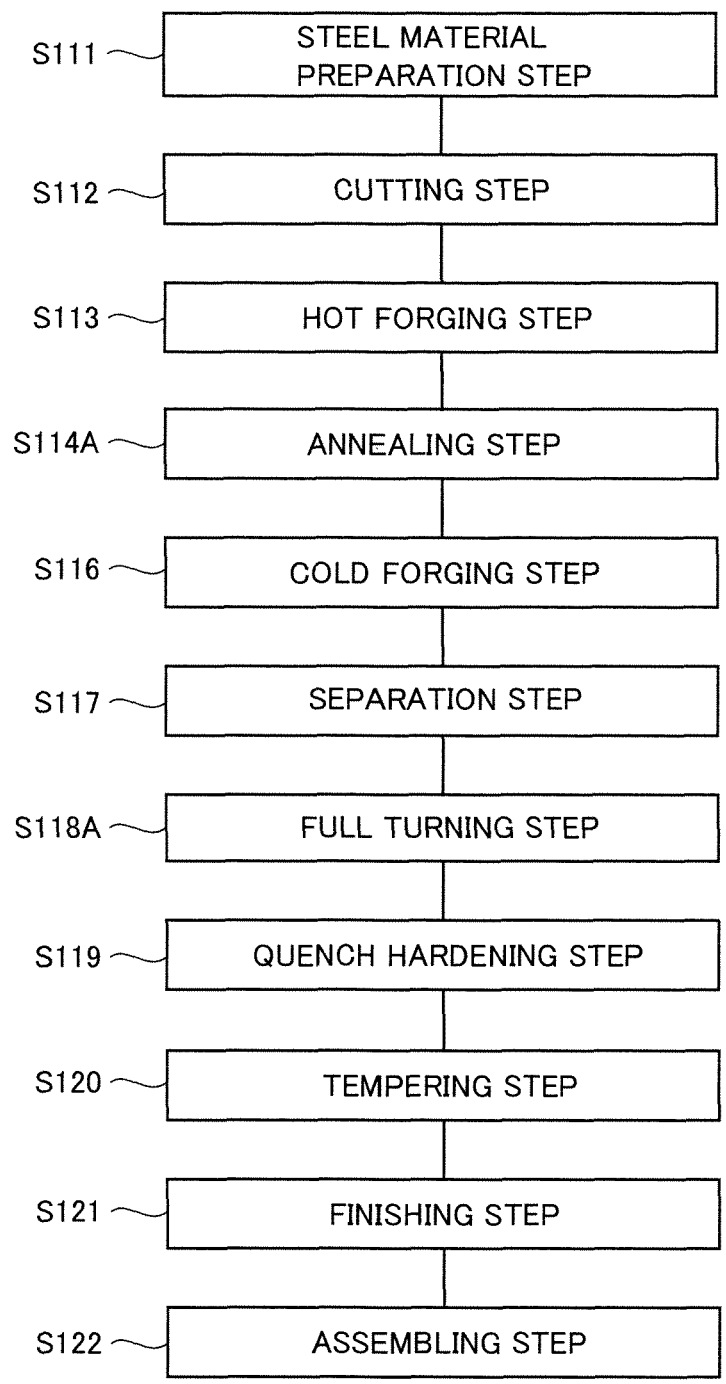
FIG. 11 is a diagram showing an example of a conventional process for manufacturing a rolling contact member and a rolling bearing.
Figure 12:
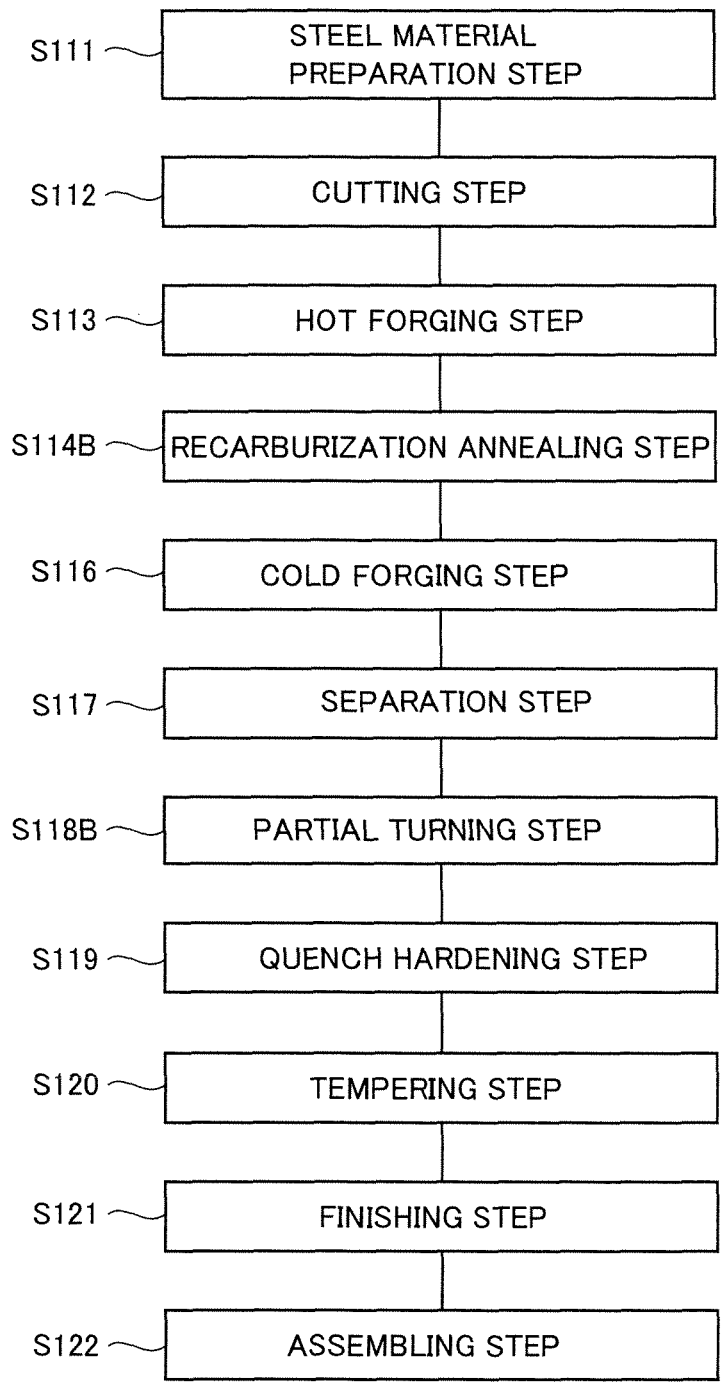
FIG. 12 is a diagram showing another example of a conventional process for manufacturing a rolling contact member and a rolling bearing.

Example 1 of the present invention is now described. As to states of surface layer portions of stepped rings immediately after cold forging, an experiment comparing a raceway member of a rolling bearing according to the present invention and a raceway member of a conventional rolling bearing was conducted. The procedure of the experiment is as follows:

First, a process for preparing test pieces subjected to a test is described. First, a steel bar of SUJ2 according to JIS was prepared. This was employed as the material, and the process for manufacturing a rolling contact member according to one embodiment of the present invention described with reference to FIG. 4 was executed up to the step (S16). The obtained stepped ring was employed as the test piece (Example of the present invention). On the other hand, similarly prepared steel bars of SUJ2 were employed as the material, and the conventional processes for manufacturing rolling bearings described with reference to FIGS. 11 and 12 were executed up to the steps (S116) respectively. The obtained stepped rings were employed as the test pieces respectively (comparative example 1 and comparative example 2).

Then, the stepped rings were cut along surfaces perpendicular to surfaces (test surfaces) for forming outer ring rolling surfaces. These sections were polished and thereafter corroded by picral (picric acid alcoholic solution), and portions around the test surfaces were observed with an optical microscope.

Figure 8:
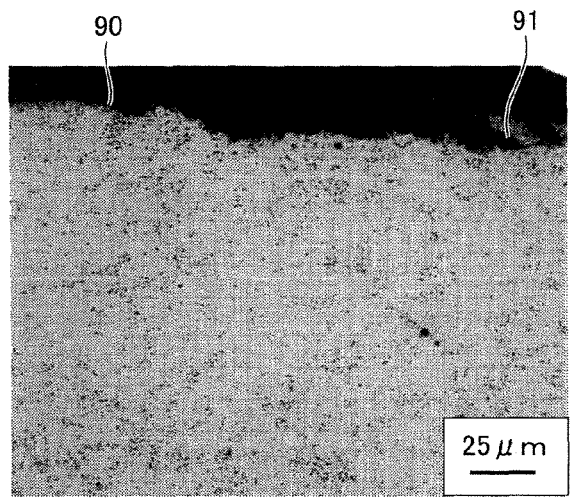
FIG. 8 is an optical microphotograph of a microstructure around a test surface of comparative example 1.
Figure 9:
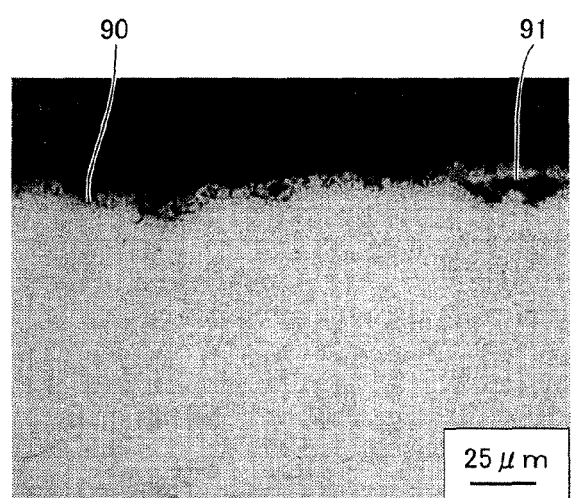
FIG. 9 is an optical microphotograph of a microstructure around a test surface of comparative example 2.
Figure 10:
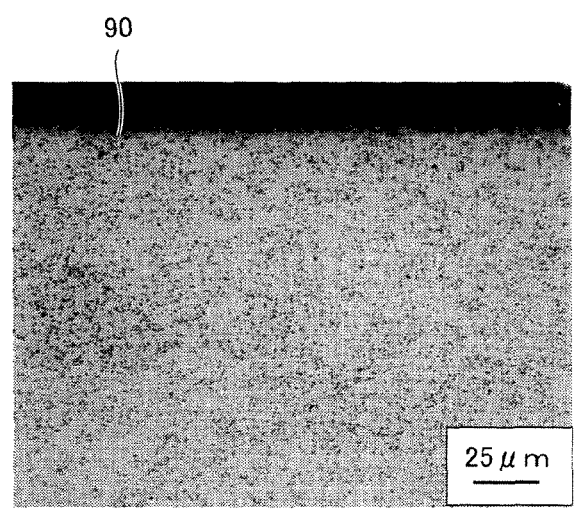
FIG. 10 is an optical microphotograph of a microstructure around a test surface of Example according to the present invention.

The experimental results in Example 1 are now described with reference to FIGS. 8 to 10. Referring to FIGS. 8 to 10, the upper sides are the outer ring rolling surface sides, white areas are bases of steel, and black points are cementite (iron carbide: $Fe_3C$).

Referring to FIG. 8, a test surface 90 is formed by executing the hot forging and the annealing in the step (S113) and the step (S114A) in air as described above and cold-forging the surface at that time as such in comparative example 1. In comparative example 1, therefore, a decarburized layer having a small quantity of cementite is observed around test surface 90. In comparative example 1, further, not only a burr 91 is observed but also test surface 90 is remarkably irregularized due to formation of a scale. If a bearing ring of the rolling bearing is completed without removing test surface 90 by turning or the like, therefore, the decarburized layer cannot be completely removed by grinding, and problems of residual of tensile stress and insufficient quench hardening attributed to the decarburized layer arise on the outer ring rolling surface. Further, there is also such apprehension that burr 91 acts as a defect to reduce the rolling contact fatigue life of the bearing ring.

Referring to FIG. 9, on the other hand, a decarburized layer formed in the hot working in the step (S113) disappears due to the recarburization annealing in the step (S114B) in comparative example 2. In comparative example 2, therefore, no decarburized layer is observed around a test surface 90. In comparative example 2, however, the cold forging is executed in the step (S116) without completely removing a scale formed in the step (S113). In comparative example 2, therefore, not only a burr 91 is observed but also test surface 90 is remarkably irregularized. If a bearing ring of the rolling bearing is completed without removing test surface 90 by turning or the like, therefore, there is such apprehension that burr 91 not completely removable due to influence by the irregularity acts as a defect depending on a grinding allowance, to reduce the rolling contact fatigue life of the bearing ring.

Referring to FIG. 10, a test surface 90 is formed by performing turning in the step (S15) and thereafter performing cold forging in the step (S16) in Example according to the present invention. In Example according to the present invention, therefore, no decarburized layer is observed around test surface 90. In Example according to the present invention, further, not only no burr is observed but also the surface of test surface 90 is smooth. With respect to test surface 90, therefore, no cutting such as turning may thereafter be executed, and it is understood that problems attributed to formation of a decarburized layer and problems attributed to formation of a scale can be simultaneously avoided by executing the process up to the step (S21) according to one embodiment of the present invention described with reference to FIG. 4. In other words, it has been confirmed that the manufacturing cost can be reduced by reducing regions of the rolling contact member subjected to cutting such as turning executed after hot forging and annealing while simultaneously avoiding the problems attributed to formation of the decarburized layer and the problems attributed to formation of the scale according to the inventive process for manufacturing a rolling contact member.

The embodiments and Example disclosed this time are to be considered as illustrative in all points, and not restrictive. The scope of the present invention is shown not by the above description but by the scope of claims for patent, and it is intended that all modifications within the meaning and range equivalent to the scope of claims for patent are included.

INDUSTRIAL APPLICABILITY

The process for manufacturing a rolling contact member, the process for manufacturing a rolling bearing, the raceway member of a rolling bearing and the rolling bearing according to the present invention are particularly usefully applicable to a process for manufacturing a rolling contact member consisting of steel containing at least 0.7 mass % of carbon, a process for manufacturing a rolling bearing, a raceway member for a rolling bearing and a rolling bearing.

The invention claimed is:

1. A process for manufacturing a raceway member comprising:
   a steel member preparation step of preparing a steel member made of steel containing at least 0.7 mass % of carbon;
   a hot forging step of preparing a first forged member by hot-forging said steel member prepared in said steel member preparation step to form the first forged member having an annular shape;
   an annealing step of annealing said first forged member to form an annealed first forged member;
   a first cutting step of removing a part of said annealed first forged member by cutting said first forged member;
   a cold forging step of preparing a second forged member by cold-forging said annealed first forged member cut in said first cutting step to form the second forged member as a stepped ring having a first annular portion and a second annular portion wherein a diameter of an opening in the first annular portion is greater than a diameter of an opening in the second annular portion; and
   a second cutting step of removing a part of said second forged member wherein
   an area of said second forged member cut in said first cutting step is not cut in a step subsequent to the cold forging step.

2. A process for manufacturing a rolling bearing, comprising:
   a raceway member manufacturing step of manufacturing a raceway member,
   a rolling element manufacturing step of manufacturing a rolling element, and
   an assembling step of assembling a rolling bearing by combining said raceway member manufactured in said raceway member manufacturing step and said rolling element manufactured in said rolling element manufacturing step with each other, wherein said raceway member manufacturing step is executed by the process for manufacturing a raceway member according to claim 1.

3. The process for manufacturing a raceway member according to claim 1, further comprising quench hardening the raceway member after the cold forging step by heating the raceway member to a temperature of at least the $A_1$ point, holding the temperature at the at least the $A_1$ point for a period of time, and cooling the raceway member to a temperature of not more than the $M_s$ point by oil cooling, thereby providing a quench hardened raceway member.

4. The process for manufacturing a raceway member according to claim 3, further comprising tempering the raceway member by heating the quench hardened raceway member to a temperature lower than the $A_1$ point, holding the temperature lower than the $A_1$ point for a period of time, and then air cooling the raceway member.

5. The process for manufacturing a raceway member according to claim 1 further comprising:

a separation step of separating said stepped ring into a portion for forming an outer ring and a portion for forming an inner ring, said second cutting step being performed to cut and thereby remove a part of said stepped ring to provide a formed ring;

a heat treatment step of heat-treating said formed ring to form a heat-treated ring; and a finishing step of finishing said heat-treated ring, wherein an area of said stepped and formed rings that is cut in said first cutting step is not cut in a step subsequent to the cold forging step.

6. The process for manufacturing a raceway member according to claim 5, wherein the second cutting step is performed after the separating step.

7. The process for manufacturing a raceway member according to claim 1, further comprising a separating step to provide first and second rolling contact members.

* * * * *